INVENTOR.
DENNIS F. WILLIAMSON
BY *James A. Campbell*
HIS ATTORNEY

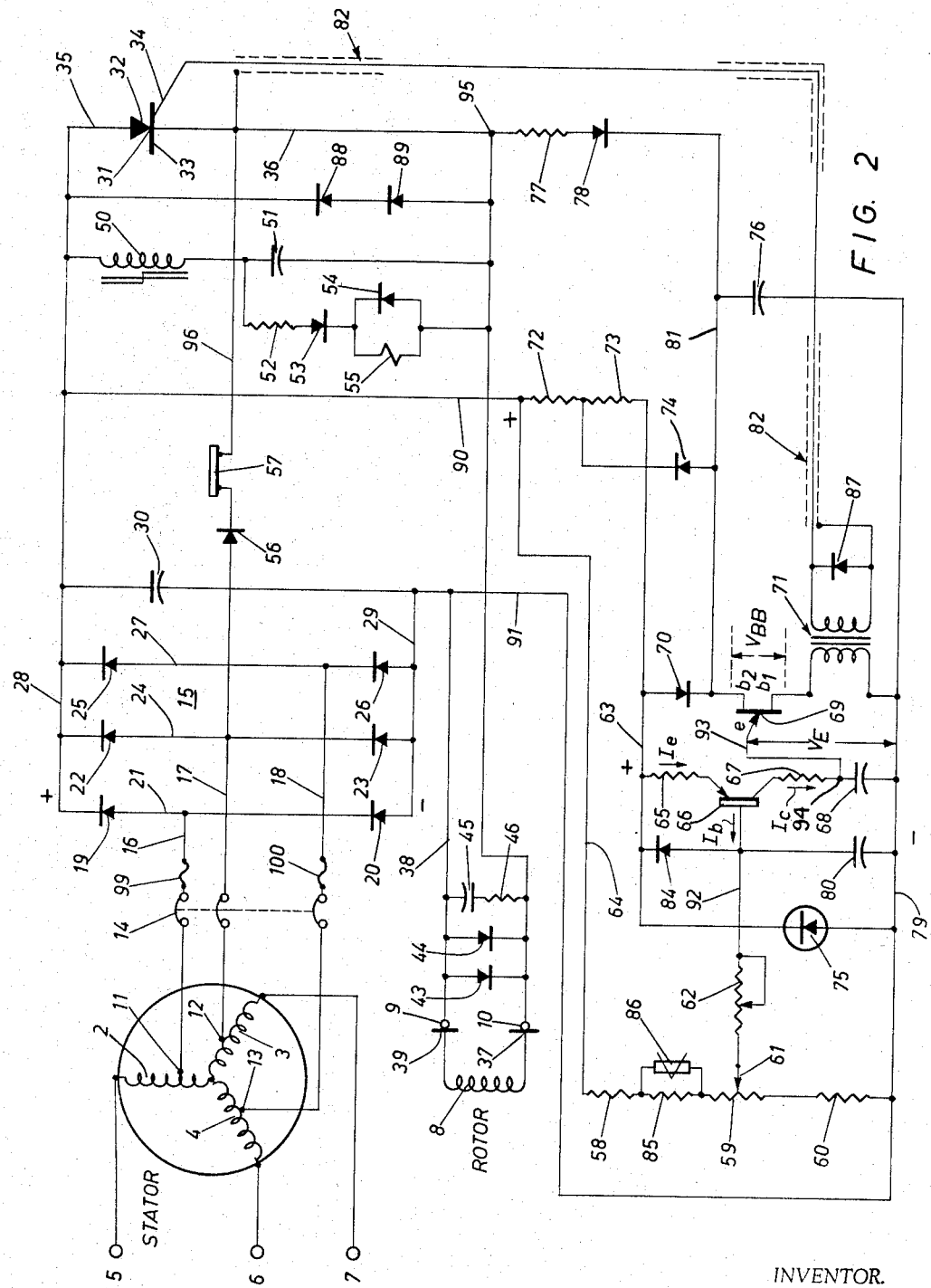

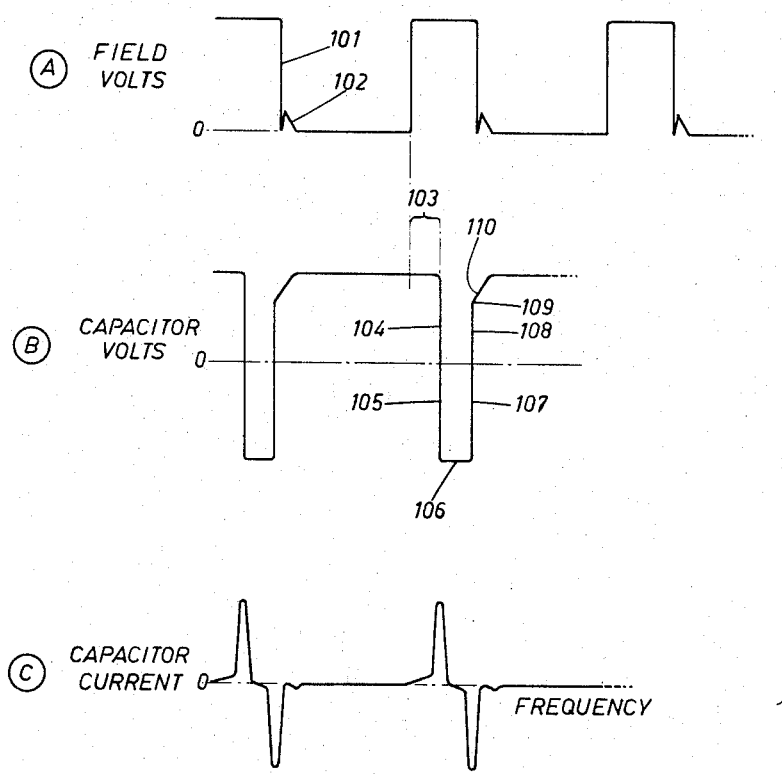
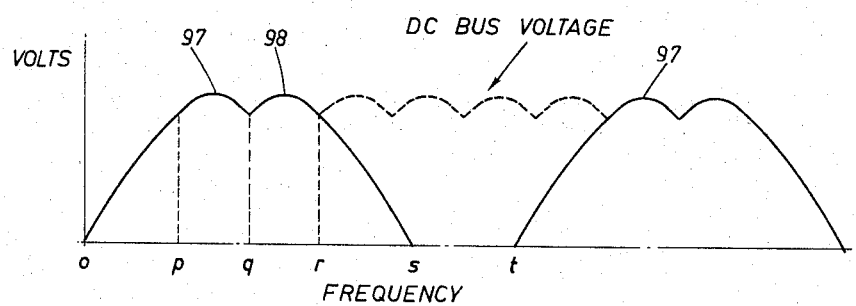

United States Patent Office 3,374,419
Patented Mar. 19, 1968

3,374,419
STATIC EXCITER AND REGULATOR FOR ROTATING GENERATORS
Dennis F. Williamson, Peterborough, Ontario, Canada, assignor to Canadian General Electric Company, Limited, Toronto, County of York, Ontario, Canada, a corporation of Canada
Filed June 24, 1964, Ser. No. 377,624
3 Claims. (Cl. 322—72)

ABSTRACT OF THE DISCLOSURE

Alternating current is taken from a convenient source such as taps on the armature windings or auxiliary armature windings of an alternating-current generator. The alternating current is converted to direct current by means of rectifiers and excites the field of the generator. A controlled unidirectional current conducting device such as a silicon-controlled rectifier (SCR) having an anode, a cathode and a gating electrode is used to control the flow of direct current from the rectifier to the field coils of the generator, the anode and cathode being connected in series with the field coils. A voltage comparator compares the output voltage of the generator with a reference voltage to obtain a control signal which is inversely proportional to the deviation of the output voltage from the reference voltage. The device is rendered conductive by applying to the gating electrode firing pulses which have a frequency proportional to the magnitude of the control signal, and conduction is terminated at a fixed time after each initiation of conduction by a quenching pulse derived from a commutating circuit and applied to the anode and cathode of the device in opposition to the voltage causing the device to conduct. The firing and commutating circuits are designed such that each pulse from the firing circuit turns the device on and each successive pulse from the commutating circuit turns the device off. The current flowing from the rectifiers to the field coils will be a high-frequency unidirectional pulsating current which the time duration of the pulses will be fixed, but the frequency of the pulses will vary with fluctuations in output voltage of the generator, the variations being such as to restore the generator voltage to a level determined by the reference voltage. Since the field coils constitute an inductive load, a flywheel arrangement of rectifiers may be employed to utilize energy stored in the inductive load to smooth out the pulsating current into a steady state current of a value which will maintain the generator voltage substantially constant. The system incorporates a lockout circuit for synchronizing the firing pulses with the quenching pulses and a recovery circuit for restoring control over the generator by the control system should this control be lost due to abnormal conditions.

This invention relates to apparatus for exciting and regulating electric generators, and in particular to static systems adapted to replace conventional rotating direct current exciters and the controls therefor used with rotating alternating current generators.

With the development of semiconductors, saturable reactors and electronic devices in general, an ever-increasing interest has been shown by the electric industry in static devices for use in exciting the field and regulating the output voltage of rotating alternating current generators. The static system is designed to replace the conventional rotating exciter and its controls. Excitation current for a static system may be taken from a convenient source such as taps on the armature windings, auxiliary armature windings or a separate source, and when this current is A.C. it will be rectified before use for excitation purposes. Since the armature winding is usually on the stator of an alternating current generator, the winding may be readily tapped for a desired voltage, the current from the tapped source rectified and then applied to excite the field of the generator. As with a conventional exciter, some means must be provided to control the exciting current such that the output voltage of the generator will remain at a preset level irrespective of the load on the generator and other variables which may affect the voltage. To be acceptable in the art at its present advanced state of development, the control scheme must be sensitive and rapid in its response to variables.

Therefore, the object of this invention is to provide static excitation for an alternating current generator wherein the system employed to regulate the output voltage of the generator is sensitive and fast.

Briefly, the invention resides in taking alternating current from a convenient source such as taps on the armature windings or auxiliary armature windings of an alternating current generator, converting the alternating current to direct current by means of rectifiers and employing the direct current to excite the field of the generator. A controlled unidirectional current conducting device such as a silicon controlled rectifier (SCR) having an anode, a cathode and a gating electrode is used to control the flow of direct current from the rectifier to the field coils of the generator, the anode and cathode being connected in series with the field coils. A voltage comparator compares the output voltage of the generator with a reference voltage to obtain a control signal which is inversely proportional to the deviation of the output voltage from the reference voltage. The device is rendered conductive by applying to the gating electrode firing pulses which have a frequency proportional to the magnitude of the control signal, and conduction is terminated at a fixed time after each initiation of conduction by a quenching pulse derived from a commutating circuit and applied to the anode and cathode of the device in opposition to the voltage causing the device to conduct. The firing and commutating circuits are designed such that each pulse from the firing circuit turns the device on and each successive pulse from the commutating circuit turns the device off. The current flowing from the rectifiers to the field coils will be a high frequency unidirectional pulsating current of which the time duration of the pulses will be fixed, but the frequency of the pulses will vary with fluctuations in output voltage of the generator, the variations being such as to restore the generator voltage to a level determined by the reference voltage. Since the field coils constitute an inductive load, a flywheel arrangement of rectifiers may be employed to utilize energy stored in the inductive load to smooth out the pulsating current into a steady state current of a value which will maintain the generator voltage substantially constant. The system incorporates a lockout circuit for synchronizing the firing pulses with the quenching pulses and a recovery circuit for restoring control over the generator by the control system should this control be lost due to abnormal conditions.

While the specification concludes with claims particularly pointing out and distinctly claiming the subject matter which I regard as my invention, it is believed the invention will be better understood from the following description taken in connection with the accompanying drawings in which:

FIGURE 2 is a wiring diagram of the system illustrated in FIGURE 1; and

FIGURES 3 and 4 illustrate wave forms of voltages and currents appearing in the system.

Figure 1:
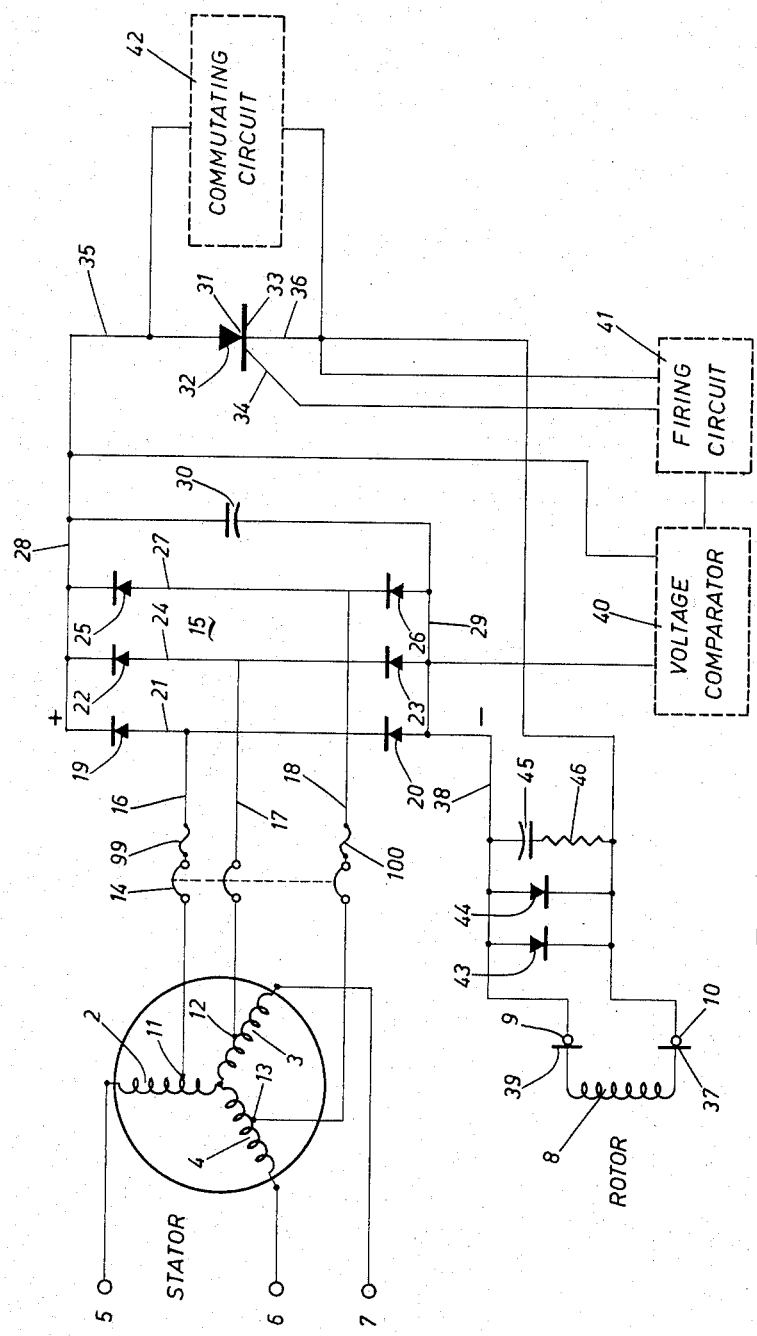
FIGURE 1 is a schematic diagram showing certain components of the system in block form.

Referring now to the drawings wherein like reference characters designate like or corresponding parts throughout the several views, there is shown in FIGURE 1, a control circuit for an alternating current generator having three phase armature windings 2, 3 and 4 on its stator connected to output terminals 5, 6 and 7 respectively and field windings 8 on its rotor connected to slip rings 9 and 10 on the rotor shaft. Windings 2, 3 and 4 are tapped at points 11, 12 and 13 respectively to obtain a balanced three phase voltage suitable for field excitation after having been converted to direct current by means of rectifiers such as the three phase, double way, bridge rectifier 15 which is connected by leads 16, 17 and 18 through a three pole circuit breaker 14 to points 11, 12 and 13 respectively of the stator winding. Lead 16 is connected between a pair of similarly poled rectifier diodes 19 and 20 by lead 21, lead 17 is connected between a pair of similarly poled rectifier diodes 22 and 23 by lead 24, and lead 18 is connected between a pair of similarly poled rectifier diodes 25 and 26 by lead 27. The other terminal of diodes 19, 22 and 25 is connected to the positive direct current bus 28, and the other terminal of diodes 20, 23 and 26 is connected across the buses to provide filtering for the rectified current and also a low impedance source for the inverter stage employed to supply pulsating direct current to field windings 8 in a manner to be described later. The positive D.C. bus 28 is connected to slip ring 10 by way of lead 35, unidirectional current conducting device 31, lead 36 and brush 37 which bears against the slip ring, and the negative bus 29 is connected to slip ring 9 by way of lead 38 and brush 39 which bears against the slip ring. Hence the excitation current supplied to field windings 8 from buses 28 and 29 passes through device 31, the circuit including its anode 32 and cathode 33.

Device 31 is employed as a chopper to regulate the flow of current to the field windings by conducting intermittently at relatively high frequencies. Actually the device interrupts the direct current intermittently and thereby converts it into pulses of unidirectional current of equal time duration but of variable frequency which depends upon the field current requirements. Since the current pulses are of equal width or time duration, an increase in the frequency will increase the value of the current passed to the field windings, i.e., the average or mean value of the intermittent current will increase, and a decrease in the frequency will lower the value of the field current. In the practice of this invention, device 31 is turned on or rendered conductive at rapid intervals in accordance with a program governed by the requirements for field current. Each time the device is turned on it is allowed to conduct for a definite brief interval of time and then turned off or rendered non-conductive, after which it is ready to be turned on again as soon as called upon by the program.

A device 31 well suited to carry out the aforementioned current regulating function is a silicon controlled rectifier (SCR) having in addition to anode 32 and cathode 33 a gating electrode 34 which upon having impressed thereon a suitable voltage renders the device conductive. An SCR is a solid state transistor-like device having anode and cathode electrodes and a gating electrode. The gating electrode controls conduction through the device in that it initiates conduction but thereafter loses control over electric conduction through the anode and cathode of the device. For a more detailed description of the silicon controlled rectifier, reference is made to chapter 1 of the "SCR Manual," Second Edition, published by the General Electric Company, Auburn, N.Y.

As already pointed out, turning device 31 on is governed by the field current requirements which in turn are related to the output voltage of the generator. Therefore, to maintain the output voltage of the generator at a predetermined level it is necessary to control the field current in a way which tends to compensate for deviations of the output voltage from this level. A voltage representing the deviation of the generator output voltage from a predetermined level can be obtained from voltage comparator 40. Since the voltage across buses 28 and 29 is taken from taps on the armature winding, it is proportional to the output voltage of the generator and is compared with a constant voltage to obtain a control signal representing the deviation in generator output voltage from a predetermined level. The constant voltage source may be a voltage regulator fed from buses 28 and 29.

The signal obtained from comparator 40 is fed to firing circuit 41 where it is used to control the frequency of the firing or gating pulses generated in this circuit and applied to gating electrode 34 of device 31 to render the device conductive. The gating pulses are positive voltage pulses of an amplitude sufficient to turn the device on and at a frequency determined by the control signal. In view of the fact that device 31 conducts for a fixed period of time after each gating pulse, an increase of frequency will increase the proportion of conducting time and consequently increase the average or effective current passed by the device to field winding 8. A decrease in the frequency will have the opposite effect and will reduce the field current. Hence the field current can be made to vary with the control signal, in a way which holds the output voltage of the generator at the aforementioned predetermined level.

The gating electrode loses control over conduction through the silicon controlled rectifier after conduction has been initiated. Therefore, in order to terminate conduction, it is necessary to reduce the relative anode-cathode potential of the device to the cut off point. For this purpose, a commutating circuit 42 is used; this circuit is a variation of the commutating circuit disclosed in Canadian Patent No. 650,993, issued Oct. 23, 1962, R. E. Morgan. As a fixed time after conduction of the device begins, commutating circuit 42 applies across the anode and cathode of the device a quenching pulse which reduces the anode-cathode potential to the cut off point and thereby terminates conduction through the device. The polarity of this pulse is such that its voltage opposes the anode-cathode voltage and its amplitude is sufficient to reduce the anode-cathode voltage to the cut off point of the device.

It has already been pointed out that the flow of current from device 31 to field windings 8 is intermittent. During the intervals when device 31 is not conducting current, the magnetic flux induced in the iron of the field structure by a previous pulse decays and induces a voltage in the field winding. This induced voltage can be used to sustain the current flow in the winding by placing across the winding one or more rectifier diodes of which the polarity is such as to allow the current to circulate in the closed loop comprising the windings and diodes. Diodes polarized in this way block current flow from device 31. Hence the presence of diodes 43 and 44 across winding 8 tends to sustain the current flow in the field windings and consequently the magnetic flux in the iron of the field structure. The diodes allow energy stored in the field structure during conduction to be released during non-conduction, thereby tending to make the current flow in windings 8 continuous. The diodes are often referred to as free wheeling rectifiers and the circuit as a flywheel type of circuit. By the addition of capacitance and resistance 45 and 46 respectively of suitable values, it is possible to clip and contain the voltage spikes appearing across leads 36 and 38, which spikes are produced by the "clean up" reverse current (hole storage current) in devices 43 and 44 immediately after device 31 turns on.

The components shown in block form in FIGURE 1 will now be described in more detail with reference to FIGURE 2. A lockout and a recovery circuit not shown in FIGURE 1 will be included with this description.

*Voltage comparator*

Positive and negative buses 64 and 79 are connected to buses 28 and 29 respectively by leads 90 and 91, and a series combination of resistors 72 and 73 and zener diode 75 is connected across buses 64 and 79. The zener diode is connected in the circuit so as to be rendered conductive at a definite voltage such that it along with resistors 72 and 73 constitute a voltage stabilizing circuit of a well known type wherein the voltage across buses 63 and 79 will remain substantially constant at a value well below the normal voltage across buses 64 and 79 so long as the latter voltage remains above the breakdown voltage of the diode. The breakdown voltage of the zener diode is low enough that a constant reference voltage will be available for the firing circuit whenever it is called upon to deliver firing pulses. Since the voltage across buses 64 and 79 is directly proportional to the output voltage of the generator, it can be compared with the constant zener voltage across buses 63 and 79 to obtain a control signal representing the deviation of the generator voltage from a reference voltage of a predetermined level. Connected across buses 64 and 79 is a voltage dividing network consisting of four resistances in series, that is, resistors 58, 85, 60 and potentiometer 59. A resistor 86 having a negative temperature coefficient of resistance is connected in parallel with resistor 85 to provide temperature compensation for the positive voltage temperature coefficient of the zener diode. A capacitor 80 connected in parallel with resistor 60 and the lower portion of potentiometer 59 filters the voltage from wiper 61 so as to make a relatively steady state voltage available for control purposes.

Transistor 66 has its base connected to the voltage appearing at the wiper 61 of potentiometer 59 by way of gain control 62 and lead 92, and has its emitter connected to the positive side of the zener reference voltage, i.e., the voltage at bus 63 through resistor 65. Resistor 65 is included in the emitter circuit to provide some temperature compensation for the transistor by sharing the voltage drop between bus 63 and the base of the transistor due to emitter-base current flow, which drop would all appear across the emitter-base junction if no resistor were provided. Consequently, the presence of resistor 65 tends to reduce variations in base current due to changes in temperature of the transistor. Particulars on transistors may be had from the General Electric Company Transistor Manual, 6th Edition, Chapter 5. Since in the configuration illustrated the base of transistor 66 is its control element, the current flowing in the emitter circuit through resistor 65 can be varied according to the voltage at wiper 61 of potentiometer 59, which voltage is proportional to voltage at the output terminals of the generator. Transistor 66 can have three internal components of current $I_e$, $I_b$ and $I_c$ as illustrated in FIGURE 2, the component $I_e$ being made up of components $I_b$ and $I_c$. Ignoring leakage current, $I_c$ is proportional to $I_b$ according to the transfer characteristic of the transistor. Therefore, it is possible to apply a relatively small value of $I_b$ to control a relatively large value of $I_c$, e.g., and $I_b$ in microamperes will control an $I_c$ in milliamperes. When the voltage at wiper 61 is lower than the constant zener voltage at bus 63, a certain current $I_b$, will flow out of the base of transistor 66, allowing a discrete value of $I_c$ to flow out of the collector of the transistor. Raising the voltage at 61 reduces the value of $I_b$ and this in turn reduces the value of $I_c$. Conversely, lowering the voltage at 61 will increase the value of $I_b$ and $I_c$. Hence the value of $I_c$ will vary inversely with the voltage at wiper 61. The current $I_c$ will be referred to hereinafter as the control signal because it is the signal used to control the firing circuit. This signal is inversely proportional to the deviation in the generator output voltage from the zener reference voltage. Transistor 66 can be likened to a varying resistance allowing more or less current to pass depending on the voltage at 61. A diode 84 is connected across the base and emitter of transistor 66 to prevent the base to emitter reverse voltage from becoming too high under transient conditions.

Firing circuit

The firing circuit for device 31 consists of the following circuit components: a resistor 67 connected to the collector of transistor 66 and to one terminal of a capacitor 68 which has its other terminal connected to bus 79; a series arrangement connected from bus 63 to bus 79 of a diode 70, bases $b_2$ and $b_1$ of a unijunction transistor 69 and the primary winding of a pulse transformer 71; a lead 93 connecting the emitter of the unijunction transistor to a point between resistor 67 and capacitor 68; a diode 87 connected in parallel with the secondary winding of the pulse transformer; and a shielded cable 82 connecting the secondary winding of the pulse transformer to the gating electrode and cathode of device 31. The current $I_c$ conducted by transistor 66 passes from the collector through resistor 67 into capacitor 68 for charging the capacitor. When capacitor 68 has been charged to a voltage $V_E$ high enough to render unijunction transistor 69 conductive, the emitter $e$ to base $b_1$ provides a conductive path through which capacitor 68 can readily discharge, which discharge circuit includes the primary winding of pulse transformer 71. The voltage pulse induced in the secondary winding of the pulse transformer due to capacitor 68 discharging through transistor 69 is transmitted through cable 82 to the cathode and gating electrode of device 31 whereby the device is fired, i.e., rendered conductive from anode to cathode. As is well known the time taken to charge capacitor 68 to the voltage $V_E$ is proportional to the current $I_c$, and since $V_E$ is a fixed proportion of the constant zener reference voltage, the frequency of the firing pulses will also be proportional to current $I_c$ or inversely proportional to the deviation in generator voltage from the reference voltage.

The unijunction transistor is a three terminal semiconductor exhibiting the unique property of being able to withhold at its emitter junction a voltage which is lower and proportional to the interbase voltage $V_{BB}$. A very small current will flow into the emitter when the voltage $V_E$ impressed on the emitter-base $b_1$ junction is lower than the interbase voltage $V_{BB}$ times a constant $n$ known as the intrinsic stand-off ratio of the device, but as soon as $V_E$ exceeds $nV_{BB}$ the emitter-base $b_1$ junction conducts readily; as a result the current in the emitter circuit rises abruptly with no further increase in $V_E$ and even continues to rise as $V_E$ falls off. For further particulars on the type of unijunction transistor suitable for use at 69 reference is made to the General Electric Company Transistor Manual, 6th Edition, Chapter 13. In the circuit illustrated the current $I_c$ controlled by transistor 66 charges capacitor 68 to the voltage $V_E$ at which unijunction transistor 69 becomes conductive, after which the capacitor discharges through the emitter-base $b_1$ junction of the unijunction transistor. On discharge of capacitor 68 its voltage $V_E$ drops to a value at which transistor 69 returns to its former non conductive state thereby completing one firing pulse for firing device 31.

Diode 87 connected across the secondary winding of transformer 71 is a reset voltage clamp for the pulse transformer. Resistor 67 is placed in the collector circuit of transistor 66 to limit current $I_c$ to a value which will permit unijunction transistor 69 to oscillate. If the current $I_c$ becomes too high, the unijunction transistor will not oscillate, consequently the resistor is used to restrict current $I_c$ to values which will not disturb oscillation of the unijunction transistor.

Commutating circuit

The quenching pulses employed to terminate conduction of the controlled unidirectional current conduction device 31 (the SCR) are obtained from a resonant circuit consisting of a saturable reactor 50 connected in series with a capacitor 51 with the series combination connected across the anode and cathode of device 31. Since reactor 50, capacitor 51 and field windings 8 are in series across buses 28 and 29, the capacitor will be charged to substantially the voltage across buses 28 and 29 whenever device 31 is not conducting. However, as soon as device 31 begins to conduct, it appears as a relatively low impedance across the capacitor, and as a result the capacitor begins to discharge immediately. Therefore, immediately device 31 is turned on (rendered conductive) by a firing pulse applied to its gating electrode 34, capacitor 51 begins to discharge through reactor 50 and the anode-cathode of device 31. Of course, it is to be understood that the components selected have values which under normal operating conditions of the circuit will allow sufficient time between successive firing pulses for the capacitor to become fully charged to the aforementioned bus voltage. A pair of serially connected unidirectional conducting diodes 88 and 89 are placed in parallel with the reactor-capacitor combination and device 31 such that they conduct current in a direction opposite to the normal current flow through device 31. Hence diodes 88 and 89 will not pass current from the positive bus 28 to field windings 8 as device 31 when conductive.

The operation of the commutating circuit will now be described. Begin by assuming that capacitor 51 is charged to the potential of buses 28 and 29. Immediately that device 31 begins to conduct, capacitor 51 begins to discharge through saturable reactor 50 and device 31, the current discharged from the capacitor flows through the device in the same direction as the current from bus 28 to field windings 8. Due to the relatively high impedance of the unsaturated reactor 50, discharging of the capacitor takes place at a relatively slow rate until the magnetic core of the reactor is driven into saturation, after which the impedance of the reactor decreases abruptly and allows the voltage across the capacitor to fall rapidly to zero. The reactor core soon reaches a state of saturation where it is no longer influenced by the rapidly decreasing current from the capacitor, whereupon the reactor releases the energy stored in it charging the capacitor in the opposite direction to the initial voltage minus losses in the circuit. Since the current flowing from the reactor is in the same direction as the current discharged from the capacitor, it too passes through device 31 in the direction in which the device normally conducts. Once the energy stored in the reactor has been released and the charge on the capacitor reversed, the capacitor discharges again through device 31, this time in a direction opposite to normal conduction through the device. The rate at which the capacitor discharges this second time is at first relatively low because reactor 50 presents a relatively high impedance to current flow, but immediately that the reactor core is driven into saturation, the reactive component of the impedance disappears, and as a result the rate of discharge of the capacitor rises abruptly; this abrupt rise in the discharge rate is accompanied by a voltage pulse high enough to terminate conduction through device 31, that is, the reverse current from the discharging capacitor rises momentarily to substantially the value of the forward current in the device, thereby returning the device to a blocking state.

This voltage will be referred to hereinafter as a quenching pulse. The quenching voltage is applied to the anode and cathode of device 31 in a reverse polarity sense so as to reduce the anode to cathode potential to the point where the device cuts off and ceases to conduct, that is, the quenching pulse is applied to the anode and cathode of the device in opposition to the voltage causing the device to conduct. Once device 31 ceases to conduct, the capacitor continues to discharge through diodes 88 and 89 until its voltage drops to zero, after which the energy stored in the reactor is released for recharging the capacitor to its initial polarity. Since the capacitor is now charged to the same polarity as buses 28 and 29 which it is across, any deficiency in its charge due to circuit losses is made up from the bus and the capacitor is again at bus voltage ready to deliver the next quenching pulse. Initially, the second discharge from the capacitor passes current through device 31 in a reverse direction because when in a forward conducting state the device offers substantially lower resistance than does the pair of series diodes 88 and 89; however, as soon as forward conduction ceases, the resistance of the device increases abruptly and as a result the current flowing from the capacitor takes the alternate path of much lower resistance through diodes 88 and 89. The period of discharge through diodes 88 and 89 is made long enough to allow device 31 to regain blocking capabilities in a forward direction so that it will again withstand the D.C. voltage on buses 28 and 29, and during this period capacitor 51 is recharged to the bus voltage. It can now be said that the quenching circuit has completed one cycle of operation beginning when device 31 was turned on and ending when the device was turned off and the circuit made ready for delivering the next quenching pulse. Capacitor 51 is a special extended foil capacitor having low leakage and dielectric losses.

Device 31 conducts for a very brief interval of time, for example, an interval of 300 microseconds with a bus voltage of 250 volts D.C. has been found to be satisfactory. The voltage across the field windings during this brief interval of conduction is illustrated graphically by the square wave form 101 shown in FIGURE 3A. The small spike 102 to the right of each wave form 101 is a representation of the voltage supplied by buses 28 and 29 as make up for losses in the circuit to bring the voltage across capacitor 51 back to the level of the buses so the capacitor is ready to deliver another quenching pulse. FIGURE 3B shows the voltage across capacitor 51. When device 31 is fired, there is a brief delay 103 before the capacitor begins to discharge; as it discharges its voltage drops to zero along line 104, builds up in the opposite direction along line 105 as the capacitor recharges, remains constant for a very brief interval at 106, drops to zero along line 107 as the capacitor discharges the second time, builds up again in the original direction along line 108 to the point 109 and receives the additional voltage 110 from the buses to restore the charge on the capacitor to its initial state in readiness for delivering the next quenching pulse. FIGURE 3C shows the wave form of the current flowing out of and into the capacitor as it discharges and charges.

*Lockout circuit*

Malfunctioning of the commutating circuit with subsequent loss of control of the generator regulating system could occur if the firing pulses applied to the gating electrode of device 31 are not synchronized with the quenching pulses from the commutating circuit. It is possible for firing pulses to be generated at a rate rapid enough to allow insufficient time for capacitor 51 to recharge to the bus voltage between successive firing pules. If this should happen a progressive decay in the voltage across the capacitor would take place because the losses in the commutating circuit are not being replenished, and as a result commutation failure would eventually occur. The lockout circuit is designed to prevent commutation failure by applying most of the D.C. bus voltage to the two bases of unijunction transistor 69 when device 31 is conducting. This is accomplished by connecting base $b_2$ of the unijunction transistor to point 95 on lead 36 through resistor 77, diode 78 and lead 81, the base $b_1$ of the transistor being connected to bus 79 through the primary winding of pulse transformer 71 as described earlier in connection with the firing circuit. Therefore, whenever device 31 conducts, the positive voltage on bus 28 minus the $I_R$ drop in device 31 is applied to base $b_2$ by way of device 31, lead 36, resistor 77, diode 78 and lead 81, and the negative voltage on bus 29 is applied to base $b_1$ by way of lead 91, bus 79 and pulse transformer 71. Diode 78 prevents the negative voltage from bus 29 from reaching base $b_2$ by way of the field windings when device 31 is not conducting. Therefore, whenever device 31 conducts, the voltage across bases $b_1$ and $b_2$ is raised above the voltage normally available from buses 63 and 79 to a level high enough to prevent the charge on capacitor 68 from rendering the unijunction transistor conductive from emitter $e$ to base $b_1$. As a result, the unijunction transistor will not conduct a firing pulse until after device 31 ceases to conduct, i.e., when the voltage across bases $b_1$ and $b_2$ drops to the aforementioned normal level. To prevent the voltage $V_{BB}$ between bases $b_1$ and $b_2$ of the unijunction transistor from reaching the full voltage across field windings 8, which voltage may be high enough to destroy the unijunction transistor, a diode clamp consisting of diode 74 is connected between lead 81 and a point between resistors 72 and 73. Resistors 72 and 73 are adjusted to provide the voltage level which $V_{BB}$ will attain. A capacitor 76 connected between lead 81 and bus 79 delays the rise of voltage $V_{BB}$ for a short time and serves also as a by pass for transient voltage spikes which may appear in the circuit.

*Recovery circuit*

A recovery circuit is provided to allow the terminal voltage of the generator to build up independently of the control normally exercised by device 31 over the field current. This circuit consists of a diode 56 having its anode connected to any one phase of the A.C. supply for field excitation, e.g., lead 24 as shown in FIGURE 2, and its cathode connected to the cathode of device 31 through the normally closed contacts 57 of relay 55, which relay has its coil connected across capacitor 51 in series with a resistor 52 and a diode 53. Diode 53 allows current to flow through coil 55 in the same direction that the current flows into capacitor 51 when it is being charged from buses 28 and 29, and a free wheeling diode 54 connected across coil 55 passes current in the opposite direction and thereby smooths the current flowing in the coil. In a parallel circuit such as this, the voltage across the coil will be a portion of the voltage across the capacitor.

To start the system, first the generator is brought up to rated speed and the multipole circuit breaker 14 is then closed. The voltage appearing in armature windings 2 to 4 due to residual flux is applied to field windings 8 through diode 56 normally closed contacts 57, leads 96, 36 and 38, bus 29 and a leg of rectifier bridge 15. The voltage so produced appears as illustrated in FIGURE 4. From period $o$ to $q$ diodes 56 and 20 conduct current; from period $q$ to $s$ diodes 56 and 26 conduct current; from period $s$ to $t$ there is no conduction; after $t$ the conducting and non-conducting cycles are repeated in succession. The waver form of the voltage appearing across the field windings is illustrated by the heavy solid lines numbered 97 and 98 in FIGURE 4. During the successive intervals $s$ to $t$ device 31 may pass some current to the field windings depending on the voltages available in the firing and commutating circuits but building up the voltage of the generator does not depend on this field current. However, as the generator voltage builds up, the charge on capacitor 51 increases until its voltage reaches the level at which the coil of the relay is energized sufficiently to open contacts 57 and thereby place field windings 8 under the control of device 31. At this time the generator voltage will still be low, at about 50% of rated voltage, and as a result of firing circuit will be generating firing pulses at a maximum rate because the voltage at wiper 61 will be very low and consequently the value of $I_c$ will be very high. The voltage stabilizing circuit employing the zener diode is set to provide a constant reference voltage at bus 63 well in advance of relay 55 opening its contacts 57 so that the firing circuit is set to deliver firing pulses in accordance with the requirements for field current immediately that it is called upon to do so. When the output voltage of the generator reaches the rated voltage, the firing circuit adjusts the frequency of the firing pulses so that they will cause the field current to remain at a level which will maintain the output voltage within definite limits.

In addition to building up the output voltage of the generator during starting thereof, the recovery circuit is capable also of restoring the generator to normal operation after such operation has been disturbed by abnormal conditions. Suppose a faulty condition arises which causes a current to be induced in the field windings of such a high magnitude that the commutating circuit is unable to turn device 31 off. A condition of this nature will cause the voltage across capacitor 51 to oscillate rapidly to zero, whereupon relay 55 will become de-energized and contacts 57 will close. Referring again to FIGURE 4, it can be seen that from period $p$ to $r$ diode 56 is conducting in parallel with diode 22 and device 31; in fact all the current transfers to the path including diode 56 and contacts 57 because it offers the least resistance. Hence diode 31 regains its blocking ability, capacitor 51 recharges during the interval $r$ to $s$ and control of device 31 is restored. Normally, a generator will be protected by overcurrent devices such as those indicated by symbols 99 and 100 in case the regulator loses control over the generator voltage. When the generator field current rises above normal to a predetermined level device 99 and 100 cause circuit breakers 14 to open and shut down the system. By using the recovery circuit, it is posible to employ a commutating circuit of no greater capacity than necessary for normal operation rather than a circuit of enough capacity to handle abnormal conditions, that is, the recovery circuit obviates the need for a commutating circuit with the extra capacity needed to control device 31 under abnormal conditions. This reduces both the size and cost of the commutating circuit.

In summary, the system provides proportional control of field current of a generator so as to regulate the output voltage of the generator. A constant D.C. voltage is established, this voltage is employed in a comparator as a reference with which the output voltage of the generator is compared to obtain a unidirectional control signal which is inversely proportional to the deviation in generator voltage from the reference voltage. The control signal is applied to control a firing circuit which generates firing pulses for firing an SCR in circuit with the field windings of the generator and a D.C. source, which pulses have a frequency proportional to the control signal and therefore inversely proportional to the voltage deviation. Each time that the SCR is fired by a pulse from the firing circuit it is turned off again at a fixed time after firing by a quenching pulse from a commutating circuit. Therefore, each time that the SCR conducts current to the field winding it does so for a fixed period of time, but the frequency of conduction of the SCR is governed by the firing circuit according to the field current required to maintain the generator voltage at a preset level. The effective value of the field current depends on the frequency of the firing pulses, which frequency in turn depends on the extent to which the generator voltage deviates from the reference, the system being designed to maintain the generator voltage at a substantially constant level with respect to the reference voltage.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. A static system for providing proportional control of field excitation of a generator for regulating the output voltage thereof comprising:

a source of direct current at a voltage suitable for excitation of the field of the generator, a controlled unidirectional current conducting device having an anode, a cathode and a gating electrode, a circuit including the anode and cathode of said device for passing direct current from said source through said device in a forward direction to the field windings of said generator, means for comparing the output voltage of the generator with a reference voltage to obtain a control signal representing the deviation of the generator voltage from the reference voltage, a firing circuit for generating gating pulses of a variable frequency proportional to said control signal and applying the gating pulses between the cathode and gating electrode of said device for initiating forward current conduction thereof, and a commutating circuit for generating a quenching pulse at a fixed time after each initiation of conduction of said device and applying the quenching pulse between the anode and the cathode of said device in a reverse polarity sense for reducing the anode-cathode potential to the cutoff point and thereby terminating forward current conduction of the device, the sequence of firing and quenching pulses being such as to cause said device to conduct intermittently for substantially constant time intervals at a frequency varying according to the requirements for field current, and means for field current to bypass said controlled unidirectional current conducting device at generator voltages below a preset level.

2. The combination according to claim 1 wherein means is provided to delay a firing pulse until after conduction of said device ceases and second means is provided for field current to bypass said device at generator voltages below a preset level.

3. A static system for providing proportional control of field excitation of a generator for regulating the output voltage thereof comprising:

a source of direct current at a voltage suitable for excitation of the field of the generator, a controlled unidirectional current conducting device having an anode, a cathode and a gating electrode, a circuit including the anode and cathode of said device for passing direct current from said source through said device in a forward direction to the field windings of said generator, means for comparing the output voltage of the generator with a reference voltage to obtain a control signal representing the deviation of the generator voltage from the reference voltage, a firing circuit for generating gating pulses of a variable frequency proportional to said control signal and applying the gating pulses between the cathode and gating electrode of said device for initiating forward current conduction thereof, and a commutating circuit comprising a capacitor and a saturable reactor in series across the cathode and anode of said device and at least two rectifying diodes connected in series across the series combination of capacitor and reactor so as to conduct current in a direction opposite to forward conduction through said device, a recovery circuit comprising a rectifying diode connected into the exciting circuit so as to bypass said device, a relay having a pair of normally closed contacts in series with said diode and a coil connected across said capacitor, and another rectifying diode connected in series with said coil so as to conduct current in the same direction as the current flow for initially charging said capacitor.

References Cited

UNITED STATES PATENTS

| | | | |
|---|---|---|---|
| 3,151,288 | 9/1964 | Avizienis et al. | 322—28 |
| 3,214,599 | 10/1965 | Wellford | 322—28 X |

LEE T. HIX, *Primary Examiner.*

J. D. TRAMMELL, *Assistant Examiner.*